United States Patent [19]

Mahapatra et al.

[11] Patent Number: 5,749,132
[45] Date of Patent: May 12, 1998

[54] METHOD OF FABRICATION AN OPTICAL WAVEGUIDE

[75] Inventors: Amaresh Mahapatra; S. Anantha Narayanan, both of Lowell, Mass.

[73] Assignee: Ramar Corporation, Northboro, Mass.

[21] Appl. No.: 602,698

[22] Filed: Feb. 16, 1996

Related U.S. Application Data

[63] Continuation-in-part of Ser. No. 521,608, Aug. 30, 1995.
[51] Int. Cl.$^6$ .............................. H01L 41/08; G02B 6/10
[52] U.S. Cl. ................ 29/25.35; 29/527.2; 29/600; 204/192.18; 216/2; 216/24; 385/2; 385/132; 427/100
[58] Field of Search ................. 29/25.35, 527.2, 29/600, 601, DIG. 16; 204/192.18, 192.34; 385/2, 12, 130–132; 216/2, 24; 250/227.11; 310/312; 427/100, 255.3

[56] References Cited

U.S. PATENT DOCUMENTS

| | | | |
|---|---|---|---|
| 3,837,827 | 9/1974 | Carruthers et al. | 385/36 X |
| 4,112,148 | 9/1978 | Fonzi | 427/255.3 |
| 4,206,251 | 6/1980 | Chen | 427/100 |
| 4,284,663 | 8/1981 | Carruthers et al. | 29/458 X |
| 4,376,138 | 3/1983 | Alferness et al. | 427/160 X |
| 4,400,052 | 8/1983 | Alferness et al. | 385/132 |
| 4,439,265 | 3/1984 | Alferness et al. | 427/164 |
| 4,607,909 | 8/1986 | Sanford | 385/132 X |
| 4,695,121 | 9/1987 | Mahapatra et al. | 385/132 X |
| 4,709,978 | 12/1987 | Jackel | 385/3 |
| 4,714,311 | 12/1987 | Auracher | 385/2 X |
| 4,715,027 | 12/1987 | Mahapatra et al. | 385/36 X |
| 4,750,979 | 6/1988 | Gee et al. | 204/192.3 |
| 4,775,208 | 10/1988 | Robinson et al. | 385/132 X |
| 4,776,656 | 10/1988 | Sanford et al. | 385/2 |
| 4,778,234 | 10/1988 | Papichon et al. | 385/132 |
| 4,786,131 | 11/1988 | Mahapatra et al. | 385/46 |
| 4,789,212 | 12/1988 | Bristow et al. | 385/132 X |
| 4,791,388 | 12/1988 | Sanford et al. | 385/2 |
| 4,801,872 | 1/1989 | Kitano | 385/14 X |
| 4,851,079 | 7/1989 | Booth et al. | 216/24 |
| 5,189,713 | 2/1993 | Shaw | 385/2 |
| 5,227,913 | 7/1993 | McCaughan et al. | 359/341 |
| 5,267,336 | 11/1993 | Sriram et al. | 385/2 |
| 5,319,494 | 6/1994 | Miyaguchi et al. | 385/11 X |
| 5,408,566 | 4/1995 | Eda et al. | 385/131 |
| 5,436,992 | 7/1995 | Wang et al. | 385/14 X |
| 5,452,382 | 9/1995 | Shionoya et al. | 385/11 |

OTHER PUBLICATIONS

Akira Enohara, et al., "Optical Modulating Element and Its Driving Method," 06–110023, Apr. 22, 1994, Japanese patent abstract.

Hideaki Okayama, et al., "Manufacture of WaveGuide Type Optical Switch," 01–88403, Apr. 3, 1989, Japanese patent abstract.

Hiroshi Terui, "Molecular Crystal Optical Element and Its Manufacture," 59–166922, Sep. 20, 1984, Japanese patent abstract.

van der Tol, J.J.G.M. and Laarhuis, J.H., "A Polarization Splitter on LiNbO$_3$ Using Only Titanium Diffusion," *Journal of Lightwave Technology*, vol. 9, No. 7, pp. 879–886 (Jul., 1991).

Noda, J., et al., "Effect of Mg Diffusion on Ti-Diffused LiNbO$_3$ Waveguides," *Journal of Appl. Physics* 49(6), pp. 3150–5154 (Jun. 1978).

(List continued on next page.)

*Primary Examiner*—Peter Vo
*Attorney, Agent, or Firm*—Hamilton, Brook, Smith, & Reynolds, P.C.

[57] ABSTRACT

A method for diffusing titanium into a single-crystal lithium niobate substrate and guided wave devices produced therefrom provide improved mode match with coupled fibers. Preferably, the titanium diffusion occurs at a diffusion temperature for a time between about 8 hours and about 18 hours. Outdiffusion of lithium oxide is allowed to occur during titanium diffusion. The outdiffused region, typically at least about 25 µm, is much deeper than the titanium diffusion depth, typically about 5–10 µm.

13 Claims, 13 Drawing Sheets

OTHER PUBLICATIONS

Komatsu, K., et al., "Titanium/Magnesium Double Diffusion Method for Efficient Fiber-LiNbO$_3$ Waveguide Coupling," Electron Lett., vol. 22, pp. 881-882, 1986.

Bulmer, C. H., "Directional Coupling Measurements and Calculations in Ti:LiNbO$_3$ Channel Waveguides," Naval Research Laboratory, pp. 74-79, Proceedings of SPIE, vol. 408, Apr. 5-6, 1983.

Jiang, P., et al., "Buried Optical Waveguide Polarizer by Titanium Indiffusion and Proton-Exchange in LiNbO$_3$," IEEE Photonics Technology Letters, vol. 4, No. 8, pp. 881-883 (Aug., 1992).

Naitoh, H., et al., "Mode Control of Ti-Diffused LiNbO$_3$ Slab Optical Waveguides," Appl. Opt., vol. 16, No. 9, p. 2546 (1977).

Burns, w. K., et al., "Ti Diffusion in Ti: LiNbO$_3$ Planar and Channel Optical Waveguides," J. Appl. Phys. vol. 50, No. 10, p. 6175 (1979).

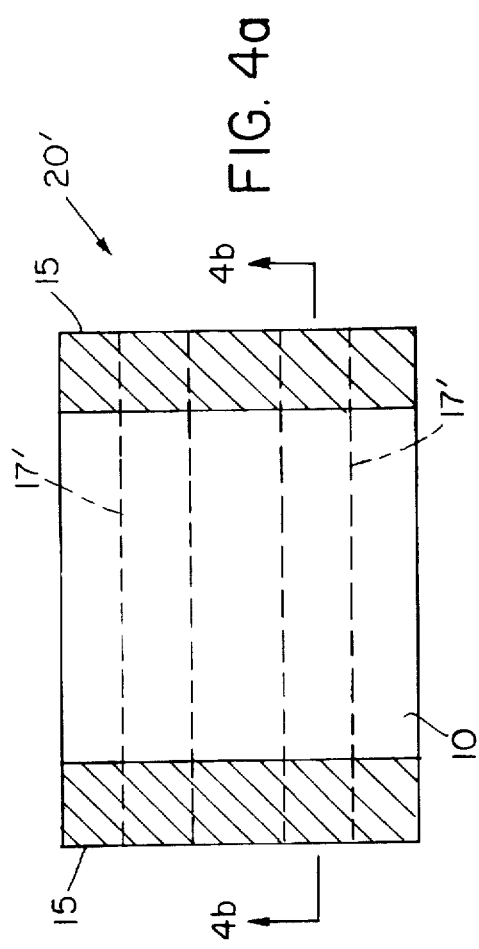
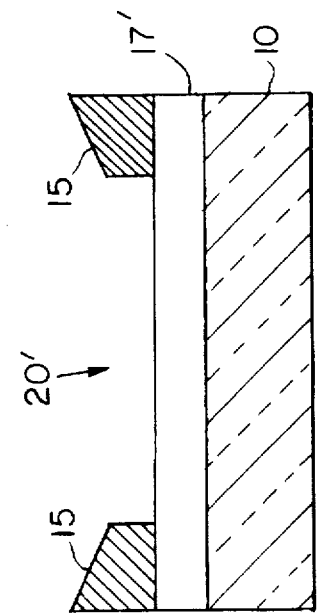
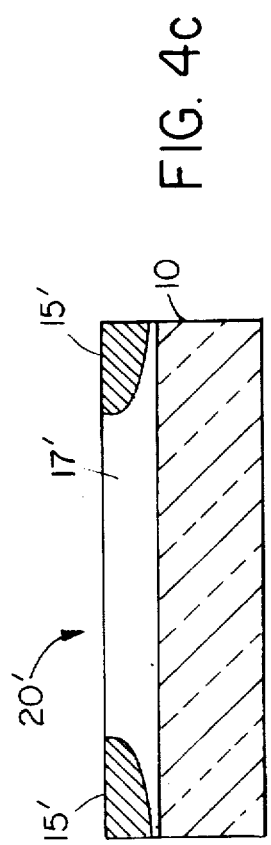
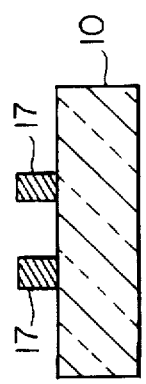
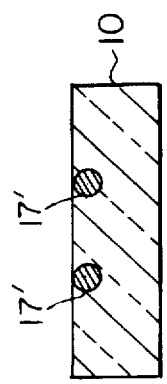
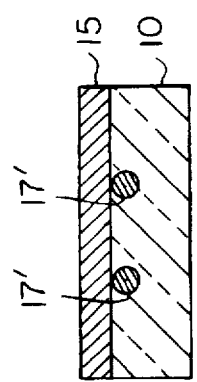
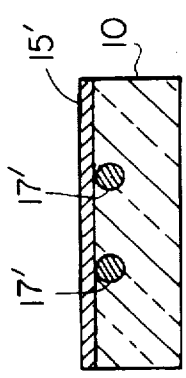

1

METHOD OF FABRICATION AN OPTICAL WAVEGUIDE

RELATED APPLICATION

This is a continuation-in-part of U.S. Ser. No. 08/521,608 filed Aug. 30, 1995 which is incorporated herein in its entirety.

BACKGROUND OF THE INVENTION

A light waveguide is formed in a birefringent crystalline substrate such as lithium niobate by depositing a metal film followed by heating of the substrate in a flowing inert gas such as argon, nitrogen or oxygen at about 1,000° C. This results in a metal diffused layer with a higher refractive index near the surface. The metal film is typically selected from vanadium, titanium, nickel, and copper. Of these metals, titanium-diffused lithium niobate waveguides have exhibited preferred optical properties for many applications.

Though this type of surface channel waveguide can guide propagation modes efficiently, insertion loss is high because of surface scattering and mode mismatch between the waveguide and a coupled fiber. Propagation modes of such surface channel waveguides are inherently asymmetric with respect to the guiding axis. By burying the waveguide under the substrate surface, modes can be made more symmetric and better matched with the fiber. Magnesium oxide has been found useful for burying the waveguide. Both the ordinary and extraordinary refractive indices of lithium niobate have been found to be reduced by diffusion of magnesium. However, deposition of magnesium in lithium niobate is difficult as special precautions are required. Proton exchange in lithium niobate has also been used to bury waveguides below the surface; however, with proton exchange only one polarization mode can be guided by the waveguide.

A polarization beam splitter is a device that separates an incoming beam of light into orthogonal TE and TM modes at the output ports. Several approaches are known for achieving a polarization splitter, including mode sorting and modal interference. Other techniques include use of a directional coupler with metal loading on one of the waveguides to prevent the TM mode from coupling. Another approach employs electro-optical effects acting differently on TE and TM coupling lengths, allowing both to be tuned independently. However, most of these techniques require stringent fabrication tolerances.

A continuing need exists to provide improvements in optical waveguides to provide more efficient coupling of light and ease of manufacture.

SUMMARY OF THE INVENTION

In accordance with the present invention, the above-discussed problems are reduced or alleviated and an effective method and device are provided, characterized by ease of manufacture with reduced fabrication tolerance controls, while improving the performance of all integrated optic devices.

A preferred embodiment of the present invention is directed to a method for co-diffusing a first material and a second material into single-crystal lithium niobate ($LiNbO_3$), and to guided wave devices which are produced by such co-diffusion. A preferred embodiment uses titanium (Ti) as the first material. Other preferred embodiments can be formed using a metal selected from the group consisting of vanadium, nickel and copper. The second material must have a refractive index lower than the substrate into which it is diffused in order to reduce the index of refraction and it must have a diffusion temperature low enough so that it will not substantially alter the properties of the waveguides that have previously been formed. The second diffused material can also be used to alter the shape of the modes to match the modes of the optical fibers coupled to the waveguide to reduce insertion loss. A preferred embodiment utilizes aluminum as the second material. Other preferred embodiments utilize a metal or semiconductor material such as lithium, tin, zinc, or silicon.

According to the method of the present invention, titanium is diffused into an x-cut birefringent crystalline material, such as $LiNbO_3$ or $LiTaO_3$, in a manner such as to define a light guiding region extending the length thereof from end-to-end. A layer of aluminum is deposited over at least the light guiding region and diffused into the birefringent crystalline material such that the light guiding region is buried below the surface of the crystal. Preferably, the initial titanium diffusion is done at a higher temperature, in the range of about 1000°–1100° C., while the diffusion of aluminum occurs at a lower temperature, in the range of about 900° to about 950° C.

One advantage of aluminum is that it is an easier material to deposit. Another advantage is that aluminum can be diffused into $LiNbO_3$ at a much lower temperature without affecting already diffused titanium waveguides.

An advantage of the present invention is the ability to alter or shape optical mode and path length characteristics of waveguides. Such mode shaping includes altering waveguide path length with aluminum diffusion to increase one path length relative to another path after optical measurement characterization of the already diffused titanium waveguides.

According to another aspect of the invention, a first layer of aluminum is deposited onto a $LiNbO_3$ crystal. Using photolithography, a pattern is formed followed by etching of the aluminum layer. A layer of titanium is deposited into the pattern to define a light guiding region therein which is surrounded on two sides by the first layer of aluminum. A second layer of aluminum is deposited overlaying the first aluminum layer and the light guiding region. The first and second aluminum layers and the light guiding region are then diffused into the $LiNbO_3$ crystal. Preferably, the titanium diffuses into the $LiNbO_3$ at about 1000°–1100° C. while the aluminum diffuses further at a lower temperature in the range of about 900° to about 950° C. By this method, the mode shape can be optimized to match with an externally coupled fiber while simultaneously burying the waveguides.

In another aspect of the invention, a guided wave device is fabricated based on the method of the present invention. Accordingly, the guided wave device comprises a light guiding region formed within a substrate fabricated of an x-cut crystalline birefringent material such as $LiNbO_3$. A burying region formed within the substrate overlaps the light guiding region such that the light guiding region is buried below the substrate surface.

In an alternate embodiment, a mode shaping region formed within the substrate surrounds the light guiding region on two sides. The mode shaping region has ordinary and extraordinary indices of refraction less than the substrate such that mode mismatch between the device and an externally coupled fiber is minimized. In the alternate embodiment, the burying region overlaps the light guiding region and the mode shaping region such that the light guiding region is buried below the substrate surface.

According to another aspect of the present invention, a polarization beam splitter is fabricated based on tuning the transfer length of one polarization, for example, the TE mode, independent of the transfer length of the other polarization, for example, the TM mode, by co-diffusing aluminum with titanium. Specifically, the polarization beam splitter comprises a pair of light guiding regions formed within a substrate fabricated of an x-cut crystalline birefringent material such as LiNbO$_3$. Each light guiding region has an input port and an output port by which radiation of TE and TM modes can be coupled in and out of the substrate. In addition, each light guiding region includes a coupling section optically coupled to the other. A tuning region formed within the substrate surrounds the light guiding regions on two sides. The tuning region has ordinary and extraordinary indices of refraction which are less than the substrate such that odd number transfer lengths of the TE mode are substantially equal to even number transfer lengths of the TE mode, thereby yielding a device capable of separating the TE and TM modes at the output ports.

The light guiding regions are preferably formed by diffusing titanium into the substrate. The tuning region is formed by diffusing aluminum into the substrate. In a preferred embodiment, the tuning region surrounds only the coupling section of each light guiding region. A polarization beam splitter according to the present invention can achieve an extinction ratio of about 20 dB for both TE and TM modes.

In another aspect of the invention, a guided wave device comprises a light guiding region defining a Mach-Zehnder interferometer having two arms formed within a substrate fabricated of an x-cut crystalline birefringent material such as LiNbO$_3$. A tuning region formed within the substrate surrounds one of the arms on two sides such that an optical path length differential between the arms is formed. Preferably, the light guiding region and the tuning region are formed by co-diffusing titanium and aluminum respectively into the substrate.

The diffusion depth produced by the known titanium diffusion processes are inadequate for efficient coupling to certain fiber optic cables having mode sizes between 8 and 12 microns. Thus, a continuing need exists to provide improvements in optical waveguides to provide more efficient coupling of light to fiber optic devices.

In accordance with the present invention, an effective method is provided for diffusing titanium in the fabrication of integrated optic devices.

A preferred embodiment of the present invention is directed to a method for diffusing titanium into single-crystal lithium niobate (LiNbO$_3$), and to guided wave devices which are produced by such diffusion.

According to the method of the present invention, a titanium layer is formed onto a surface of a lithium niobate crystalline material. The titanium is diffused into the crystalline material to form a titanium diffused region by heating the crystal to a diffusion temperature for between about 8 to 18 hours. In the past, diffusion processes used a wetting agent such as oxygen, or a lithium oxide rich ambient to prevent outdiffusion of lithium oxide from the lithium niobate crystal. During the titanium diffusion of the present invention, lithium oxide is outdiffused from the crystal to form an outdiffused region in the crystal. The outdiffused region is preferably at least twice the depth of the titanium diffused region. Alternatively, the lithium oxide outdiffusion can be performed prior to the titanium diffusion. The diffusion time is sufficient to increase the index of refraction of a surface layer of the crystal for guiding an optical wave.

One might expect to control diffusion based upon temperature to minimize diffusion time for efficiency. However, the method of the present invention instead controls the diffusion process based upon the slowly varying rate of diffusion as a function of time, resulting in longer diffusion times. Lateral diffusion in x-cut lithium niobate is an undesirable effect that increases with diffusion time. The line widths of titanium guides are adjusted to offset and, thereby control the effects of lateral diffusion. Thus, line width of the diffusion material can be used in conjunction with the other methods described herein to control the shape, size and position of optical waveguides within the substrate.

BRIEF DESCRIPTION OF THE DRAWINGS

The above and other features of the invention including various novel details of construction and combinations of parts will now be more particularly described with reference to the accompanying drawings and pointed out in the claims. It will be understood that the particular guided wave devices embodying the invention are shown by way of illustration only and not as a limitation of the invention. The principles and features of this invention may be employed in varied and numerous embodiments without departing from the scope of the invention.

FIGS. 2b–2e are diagrammatic sectional views of further product stages following the stages of FIGS. 1a–1f in the method of making the device of FIG. 2a.

FIG. 4a is a diagrammatic top plan view of an alternate embodiment of the device of FIG. 2a.

FIGS. 4b and 4c are diagrammatic sectional side views taken along line 4b—4b of FIG. 4a.

FIGS. 6b–6d are diagrammatic end views of further product stages following the stages of FIGS. 1a–1f in the method of making the device of FIG. 6a.

FIG. 20 shows coupling ratio as a function of postbake time for a device made according to FIG. 9a.

FIG. 21 shows mode size as a function of postbake time for a device made according to FIG. 9a.

FIG. 22 shows insertion loss as a function of postbake time for a device made according to FIG. 9a.

DETAILED DESCRIPTION OF THE INVENTION

The term "co-diffusion" as used herein refers to the diffusion of titanium and aluminum through the surface of a single-crystal lithium niobate substrate whether the titanium and the aluminum are diffused successively or concurrently.

It has now been discovered that co-diffusion of titanium with aluminum alters the shape of the propagation modes of guided wave devices to match with fiber modes for better insertion loss. Aluminum is patterned around titanium guides and diffused at a lower temperature compared to the titanium diffusion temperature. By use of controlled post diffusion, the mode match between the guided wave device and a coupled fiber is improved. Diffusion of aluminum to bury the titanium guides into the substrate also improves the device insertion loss. Aluminum has the advantage of being an easier material to deposit and it also can be diffused in lithium niobate at a much lower temperature without affecting already diffused titanium guides.

Figure 1A:
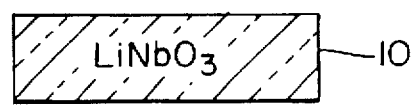
FIGS. 1a–1f are diagrammatic sectional views of intermediate product stages in the method of making a guided wave device according to the present invention.
Figure 1B:
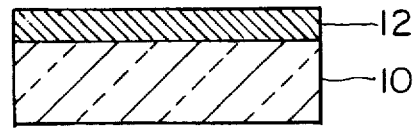
Figure 1C:
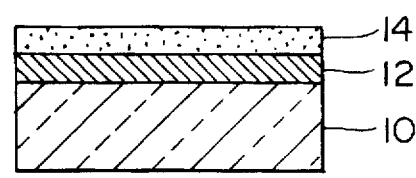

In the method of the present invention, a series of preparatory steps are employed followed by steps which are specific to fabrication of alternate embodiments. FIGS. 1a–1f illustrate the intermediate product stages resulting from these common preparatory steps. In general, an x-cut birefringent crystalline material such as lithium niobate forms a substrate 10 as shown in FIG. 1a. A layer of aluminum 12 is deposited on the substrate 10 as shown in FIG. 1b. Preferably, the aluminum layer 12 is deposited by well-known evaporation techniques. A layer of photoresist 14 is spun to overlay the aluminum layer 12 as shown in FIG. 1c.

Figure 1D:
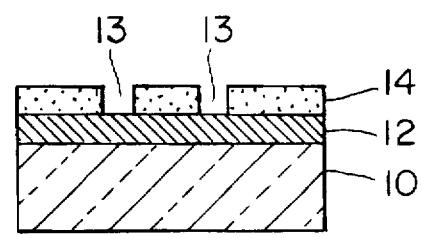
Figure 1E:
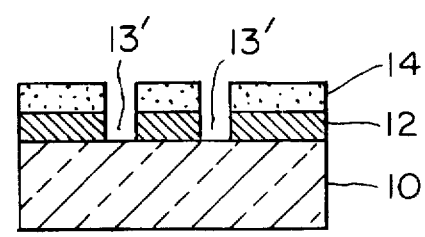
Figure 1F:
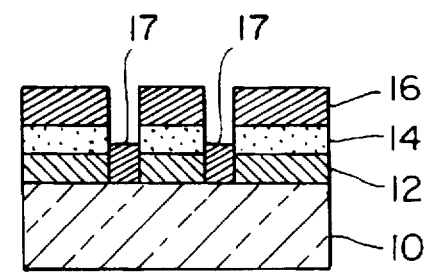

The next product stage shown in FIG. 1d results from forming a pattern using standard photolithography techniques followed by development of the photoresist layer 14. The developed pattern yields channels 13. In the next step, the portion of the aluminum layer 12 which is exposed by the channels 13 is etched to a depth coincident with the top of the lithium niobate substrate 10. This etching step yields deeper channels 13' as shown in FIG. 1e. The etching is performed by wet or dry etching. In the final preparatory step, a layer of titanium 16 is deposited over the photoresist layer 14 and also into the channels 13' to define a light guiding region 17 therein as shown in FIG. 1f.

The above preparatory steps can be used in various methods according to the present invention to fabricate guided wave devices as described further below.

Figure 2A:
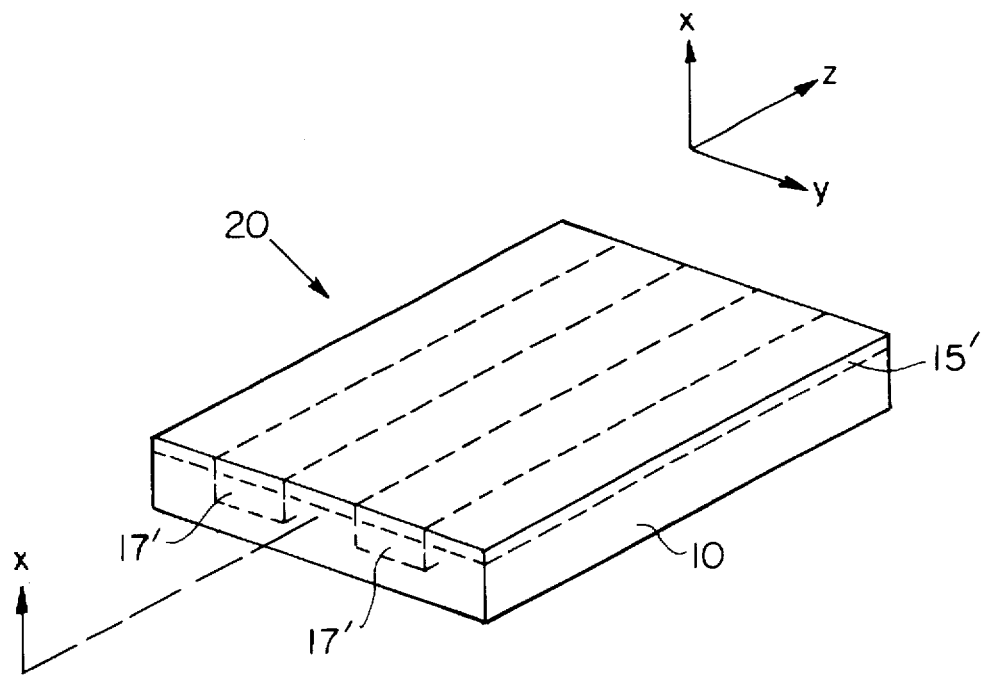
FIG. 2a is a diagrammatic perspective view of a guided wave device according to the present invention.
Figure 3:
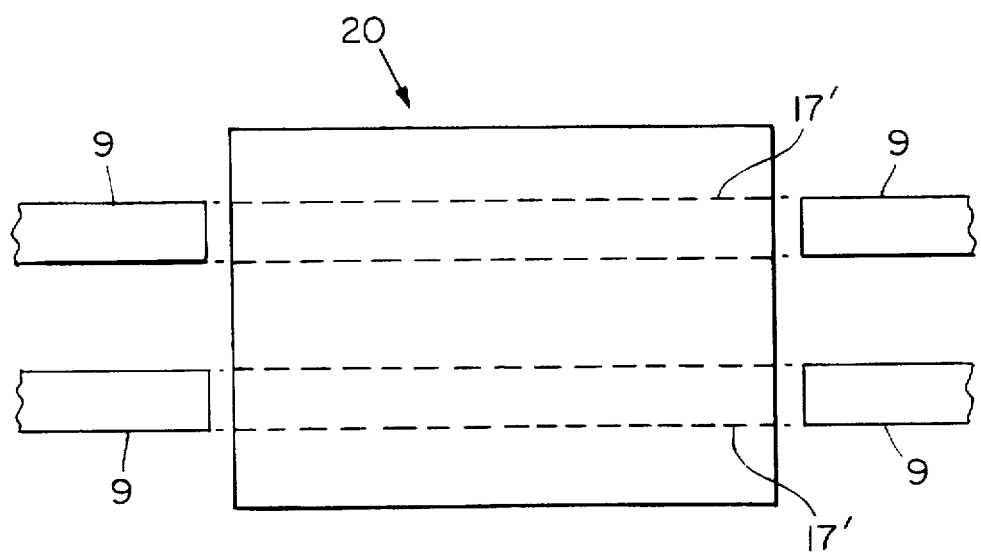
FIG. 3 is a diagrammatic top plan view of the device of FIG. 2a coupled to external fibers.

In FIG. 2a, a guided wave device according to the present invention is shown which can be fabricated using the preparatory steps of FIGS. 1a–1f and the specific steps of FIGS. 2b–2e as described herein. The guided wave device 20 in FIG. 2a is formed of an x-cut lithium niobate substrate 10 having light guiding regions (or guides) 17' which are diffused into the substrate. A diffused burying region of aluminum 15' serves to bury the guides 17' into the substrate 10. The light guides 17' of the device 20 can be coupled to external fibers 9, as shown in FIG. 3.

To fabricate the device 20 of FIG. 2a, the specific steps of FIGS. 2b–2e are employed. With the intermediate product stage shown in FIG. 1f, a double layer liftoff is performed by first developing the photoresist layer 14 followed by etching of the aluminum layer 12. The double layer liftoff step results in a substrate 10 having titanium light guiding regions 17 on the surface thereof as shown in FIG. 2b. The titanium guides 17 are then diffused into the substrate 10 as shown in FIG. 2c. Preferably, the titanium diffusion is achieved by heating the intermediate product of FIG. 2b in the range 1000°–1100° C. for approximately 6–14 hours. A second aluminum layer 15, having a thickness in the range of 100 Å to 1000 Å, is deposited over the surface of the intermediate product of FIG. 2c as shown in FIG. 2d.

In the final stage, as shown in FIG. 2e, the aluminum is diffused into the substrate 10 to form a burying region 15' which buries the titanium guides 17'. The aluminum can be diffused at about 900° to about 950° C. At this temperature, only the aluminum is diffused without altering the electro-optical property of the previously diffused titanium. The titanium guides 17' increase both the ordinary and extraordinary indices of refraction of the lithium niobate substrate, while the aluminum layer 15' reduces both indices since the index of aluminum is less than lithium niobate. The result is a more symmetric modal power distribution with respect to the axis of the guided wave device 20 as well as improved coupling efficiency between the device 20 and an externally coupled fiber (as shown in FIG. 3). In addition, low surface scattering loss and low insertion loss are achieved.

In an alternate embodiment shown in FIGS. 4a–4c, a guided wave device 20' is fabricated similar to the device 20 of FIGS. 2a–2e, except that only end portions of the substrate 10 have an aluminum layer 15 deposited thereon. As shown in FIG. 4b, the aluminum layer 15 at each end of the substrate 10 is tapered, increasing in depth towards the ends. The tapered aluminum layer 15 is desirable for effecting mode matching with respect to externally coupled fibers (similar to FIG. 3). This is achieved by diffusing the aluminum layers 15 into the substrate to form burying regions 15' which bury the titanium guides 17' as shown in FIG. 4c. The tapered aluminum layers 15 can be formed using a shadow mask or by wet etch or plasma etch.

Figure 5A:
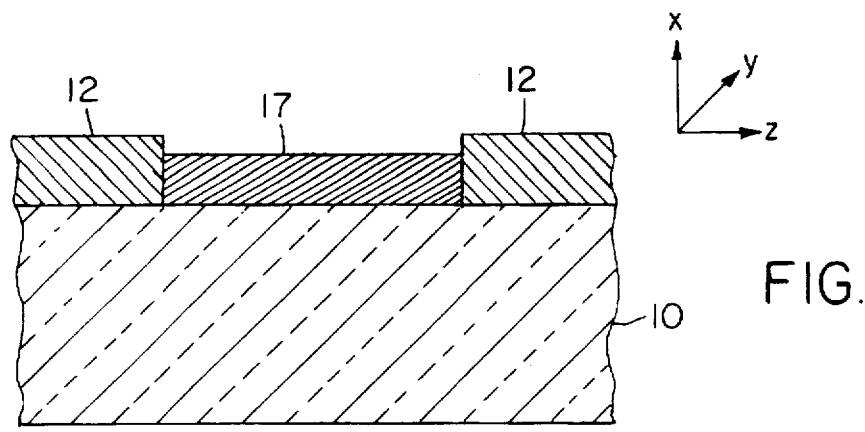
FIGS. 5a–5b are diagrammatic sectional views of a device embodying the mode shaping aspect of the present invention.
Figure 5B:
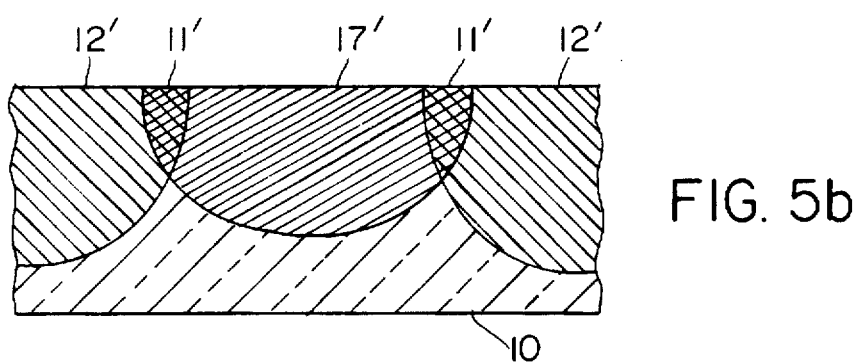

To understand the mode shaping aspect of the present invention, consider that lateral diffusion, which occurs in x-cut lithium niobate, imparts a spreading effect to the refractive index profile with respect to the lateral or z-axis of the substrate. The spreading effect due to lateral diffusion can result in mode mismatch between the waveguide and a coupled fiber. Co-diffusion of aluminum has been found to adequately compensate for the lateral diffusion. This can be seen in the embodiment illustrated in FIGS. 5a and 5b. In FIG. 5a, a substrate 10 is initially prepared according to the preparatory steps of FIGS. 1a–1f. A liftoff step is performed on the stage corresponding to FIG. 1f to develop and remove photoresist layer 14 and titanium layer 16 to yield a titanium guide 17 disposed between aluminum layer 12. The aluminum and titanium are then co-diffused into the substrate 10. As shown in FIG. 5b, co-diffusion results in a diffused titanium guide 17' disposed between diffused aluminum regions 12'. Due to lateral diffusion, titanium and aluminum portions overlap in regions 11 of substrate 10. In overlap regions 11, the aluminum cancels the refractive index increase from the titanium such that the refractive index profile with respect to the z-axis is effectively narrowed to yield a better mode match between the waveguide 17' and a coupled fiber (not shown).

Figure 6A:
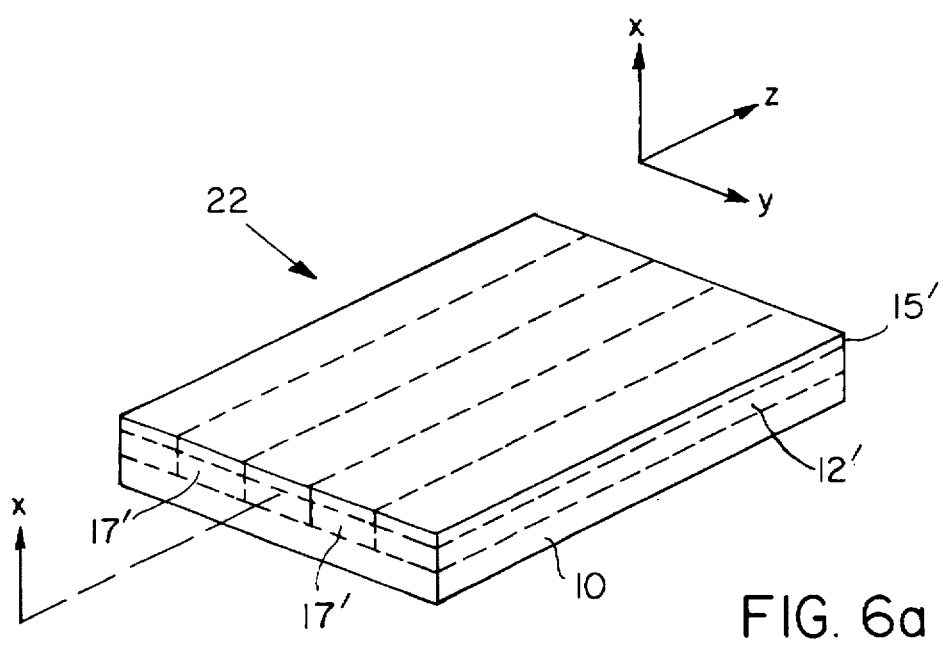
FIG. 6a is a diagrammatic perspective view of another guided wave device according to the present invention.

FIG. 6a illustrates another guided wave device 22 fabricated by the method of the present invention and is characterized by having both mode shaping and buried guides. The titanium guides 17' formed in the substrate 10 are surrounded on both sides by a first layer of diffused aluminum 12'. The first diffused aluminum layer 12' serves to further shape the modes to match with the fiber modes for better insertion loss. A second layer of diffused aluminum 15' serves the burying function as described above.

Figure 6B:
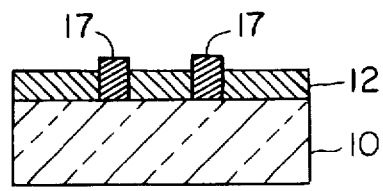
Figure 6C:
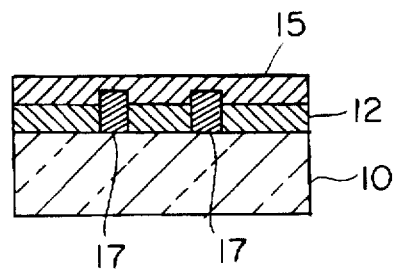
Figure 6D:
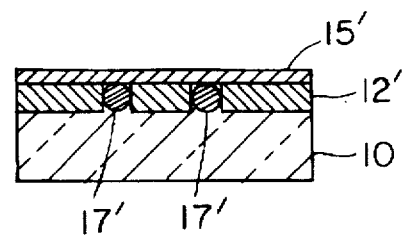

To fabricate the device 22 shown in FIG. 6a, specific steps in addition to the preparatory steps of FIG. 1a–1f are employed. The specific stages are shown in FIGS. 6b–6d. Beginning with the intermediate product stage shown in FIG. 1f, a liftoff step is performed wherein the photoresist layer 14 is developed and removed. In FIG. 6b, the photoresist layer 14 has been removed along with the titanium layer 16, leaving an aluminum layer 12 surrounding titanium guides 17. A second aluminum layer 15 is then deposited as shown in the product stage of FIG. 6c. The second aluminum layer 15 overlays the first aluminum layer 12 and the titanium guides 17.

Following the aluminum deposition, the aluminum and titanium are co-diffused into the substrate. As shown in FIG. 6d, the final stage results in a device having a mode shaping region of diffused aluminum 12' surrounding diffused titanium guides 17' and overlayed with a diffused aluminum burying region 15'. Initially, the titanium is diffused along with the aluminum at about 1000°–1100° C. for a period of time. This is followed by further diffusion of the aluminum at a lower temperature in the range of about 900° to about 950° C. Therefore, the initial titanium diffusion can be done at higher temperature and the mode shape can be optimized to match with the fiber by further diffusing aluminum at a lower temperature.

It should be noted that effective burying regions can also be formed by diffusing a metal or semiconductor material such as lithium, tin, zinc, or silicon, though aluminum is preferred due to the advantage of it being an easier material to handle for deposition and for its preferred optical properties. Aluminum is also preferred since it can be diffused in lithium niobate at a much lower temperature without affecting already diffused titanium guides.

Figure 7:
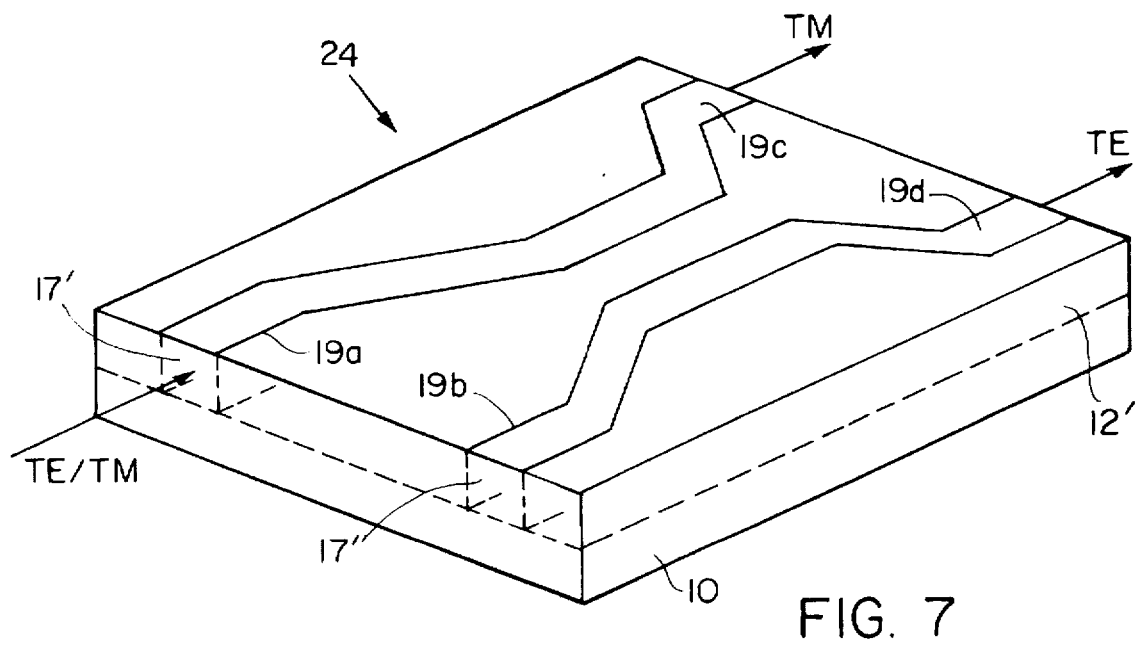
FIG. 7 is a diagrammatic perspective view of a polarization beam splitter according to the present invention.

In FIG. 7, a polarization beam splitter 24 is shown which is fabricated in accordance with the method of the present invention. The operation of the beam splitter 24 will be described further below. The beam splitter 24 includes diffused light guiding regions or titanium guides 17' formed in a coupler pattern in substrate 10. A diffused aluminum layer 12' laterally surrounds the titanium guides 17'. The titanium guides 17' at one edge of the device 24 form input ports 19a and 19b and at the opposite edge form output ports 19c and 19d.

Figure 8:
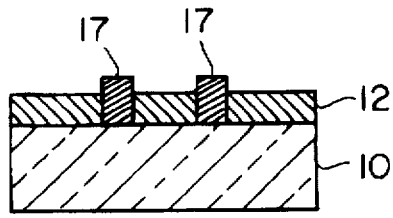
FIG. 8 is a diagrammatic end view of a further product stage following the stages of FIGS. 1a–1f in the method of making the splitter of FIG. 7.
Figure 9:
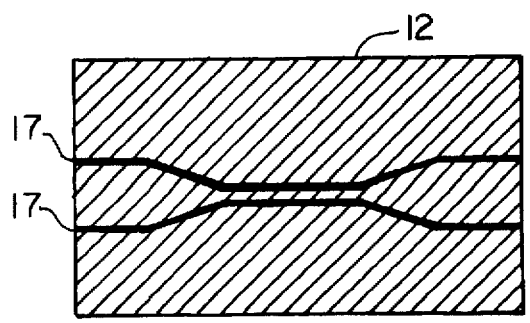
FIG. 9 is a diagrammatic top plan view of the product stage of FIG. 8.
Figure 10:
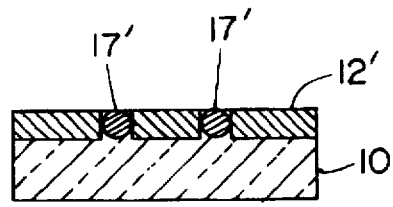
FIG. 10 is a diagrammatic end view of the splitter of FIG. 7.

Fabrication of the beam splitter 24 is accomplished by the preparatory steps of FIGS. 1a–1f together with the steps shown in FIGS. 8–10. The intermediate product of FIG. 1f undergoes a liftoff operation whereby the photoresist layer 14 is developed to remove the titanium layer 16. In FIG. 8 is shown the resulting product stage in which the deposited aluminum layer 12 remains and surrounds the titanium guides 17. In FIG. 9 is shown a top plan view illustrating the specific coupler pattern forming the titanium guides 17. The aluminum layer 12 and the titanium guides 17 are co-diffused to yield diffused titanium guides 17' surrounded by tuning region 12' in the end product as shown in FIG. 10.

The co-diffusion of titanium and aluminum is performed initially at higher temperature at about 1000°–1100° C. for a period in the range of 6–14 hours followed by post diffusion of the aluminum only at a lower temperature in the range of 900° to 950° C. In an alternate embodiment of the beam splitter 24, a portion of the aluminum layer 12 is etched, leaving an aluminum layer 12b only in the coupling section around the titanium guides 17. This step is performed prior to the co-diffusion stage shown in FIG. 10.

In either beam splitter embodiments, the diffused aluminum tuning region 12' performs a particular mode shaping function whereby odd number transfer lengths of the TE mode are substantially equal to even number transfer lengths of the TM mode. This results in a device which can operate to separate the TE and TM modes at the output ports 19c and 19d (FIG. 7). Thus, a mixed TE/TM beam input to input 19a is separated into TM and TE modes at outputs 19c and 19d respectively.

Figure 11:
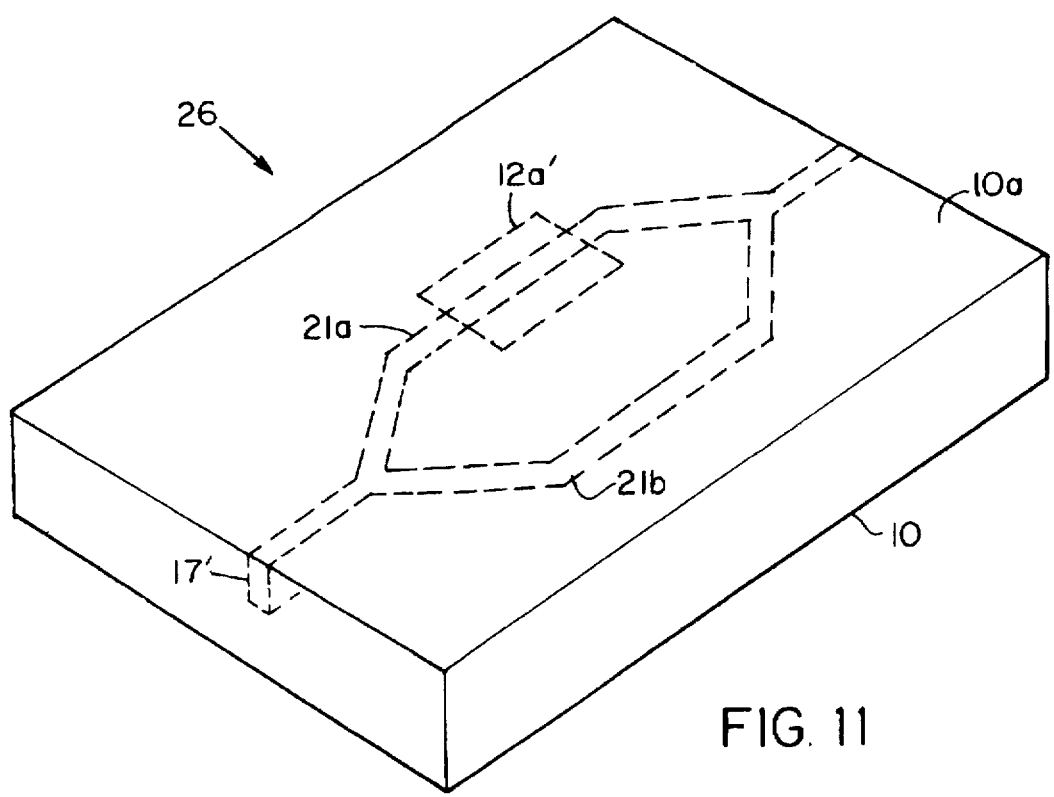
FIG. 11 is a diagrammatic perspective view of a Mach-Zehnder interferometer according to the present invention.
Figure 13:
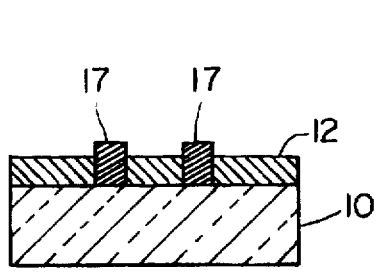
FIG. 13 is a diagrammatic cross-sectional view of the product stage of FIG. 12.

Referring now to FIG. 11, a Mach-Zehnder interferometer 26 is shown which is fabricated according to the method of the present invention. The Mach-Zehnder device 26 is formed of a titanium light guiding region 17' diffused into a lithium niobate substrate 10. A diffused aluminum region 12a' is formed around arm 21a of the Mach-Zehnder pattern.

To fabricate the Mach-Zehnder device 26, specific steps are performed in addition to the preparatory steps outlined in FIGS. 1a–1f. The stages resulting from these specific steps are shown in FIGS. 12–15. Beginning with the intermediate stage of FIG. 1f, the first specific step is to lift off the photoresist layer 14 to remove the titanium layer 16.

Figure 12:
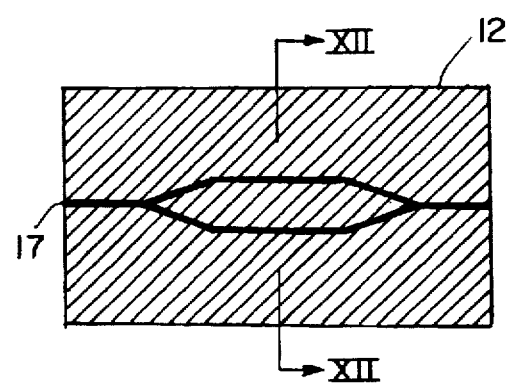
FIG. 12 is a diagrammatic top plan view of a further product stage following the stages of FIGS. 1a–1f in the method of making the interferometer of FIG. 11.
Figure 14:
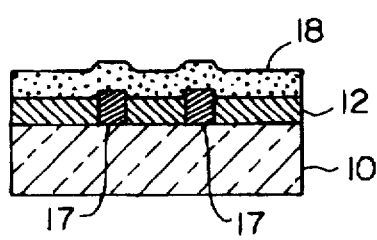
FIG. 14 is a diagrammatic cross-sectional view of a further product stage following the stage of FIG. 13.
Figure 15:
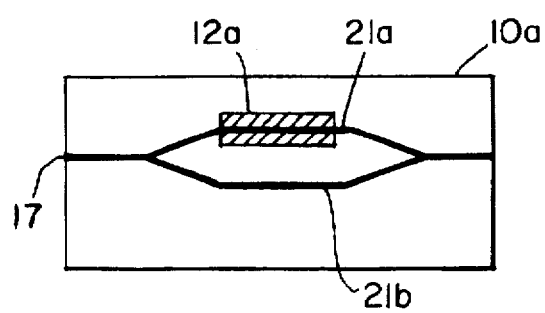
FIG. 15 is a diagrammatic top plan view of a further stage following the stage of FIG. 14.

The titanium light guiding region 17 is then formed as a Mach-Zehnder pattern as shown in FIG. 12. The deposited aluminum layer 12 surrounds the titanium light guiding region 17 and overlays the lithium niobate substrate 10. This is also seen in the cross-sectional view of FIG. 13. A second photoresist layer 18 is spun to overlay the aluminum layer 12 and the titanium region 17, as shown in FIG. 14. The second photoresist layer 18 is patterned around the titanium guide 17 in arm 21a of the Mach-Zehnder. The aluminum layer 12 is then etched, yielding aluminum region 12a surrounding arm 21a as shown in FIG. 15. The aluminum and titanium are then co-diffused according to the co-diffusion process discussed above. Referring again to FIG. 11, the diffused aluminum region 12a' performs a tuning function such that an optical path length differential between arms 21a and 21b is formed.

Figure 16A:
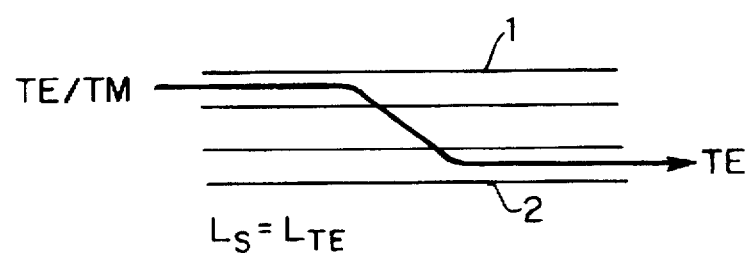
FIGS. 16a–b show the principle of TE and TM mode separation.
Figure 16B:
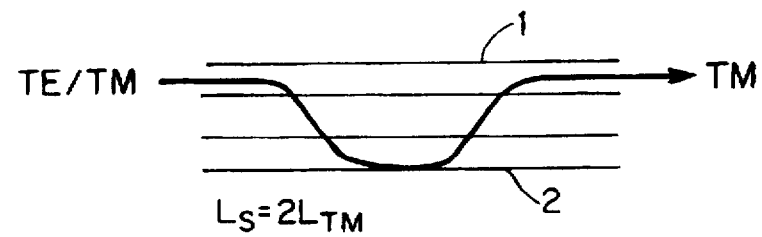

As discussed above, according to a preferred embodiment of the present invention, a polarization beam splitter is fabricated based on tuning the transfer length of one polarization, for example, the TE mode, independent of the transfer length of the other polarization, e.g. the TM mode, by co-diffusing aluminum and titanium in a guided wave device structure. FIGS. 16a and 16b illustrate the basic principle of TE/TM mode separation. When power is launched in waveguide 1, complete power transfer occurs at the exit port of the waveguide 2 after a distance $L_s = (2m \pm 1) L_c$. Similarly, for $L_s = 2m\, L_c$, the power transfers back to port 1 where m is an integer and $L_c$ is the coupling length defined as the length which provides complete power transfer. For the design of a TE/TM polarization beam splitter, launching both TE and TM polarizations at the input of waveguide 1 should yield separation of the two polarizations at the output. Under these conditions, $L_s$ should satisfy the following condition:

$$L_s = (2m-1)\, L_{TE} = 2m\, L_{TM} \quad \text{Eq. (1)}$$

For example, for m=1, $L_{TE} = 2 L_{TM}$, which means that the transfer length of TE polarization is twice the TM polarization or vice-versa. When the condition of (1) is satisfied, one polarization is in the "cross" state and the other is in the "bar" state. In contrast, the case of a polarization insensitive coupler requires that $L_{TE} = m\, L_{TM}$. In that case, the transfer length of one polarization is equal to or a multiple of the transfer length of the other polarization, where m is an odd integer.

Examples of the alternate embodiments of the beam splitter 24 (FIG. 7) were carried out for two configurations:

EXAMPLE I

In the first case, the aluminum is diffused fully across the substrate except for the titanium guides (FIG. 9).

EXAMPLE II

Figure 9A:
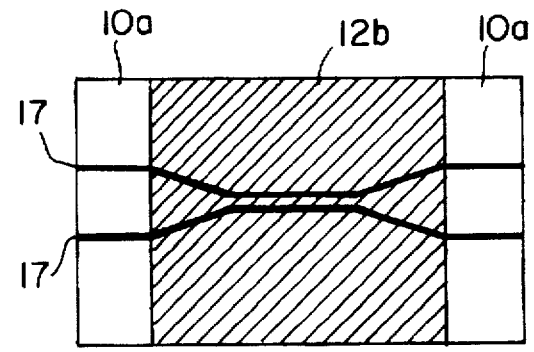
FIG. 9a is a diagrammatic top plan view of an additional product stage following the stage of FIG. 9 for making an alternative polarization beam splitter.

In the second case, the aluminum is diffused only in the coupling region of the coupler except for the titanium guides (FIG. 9a).

Results

Figure 17A:
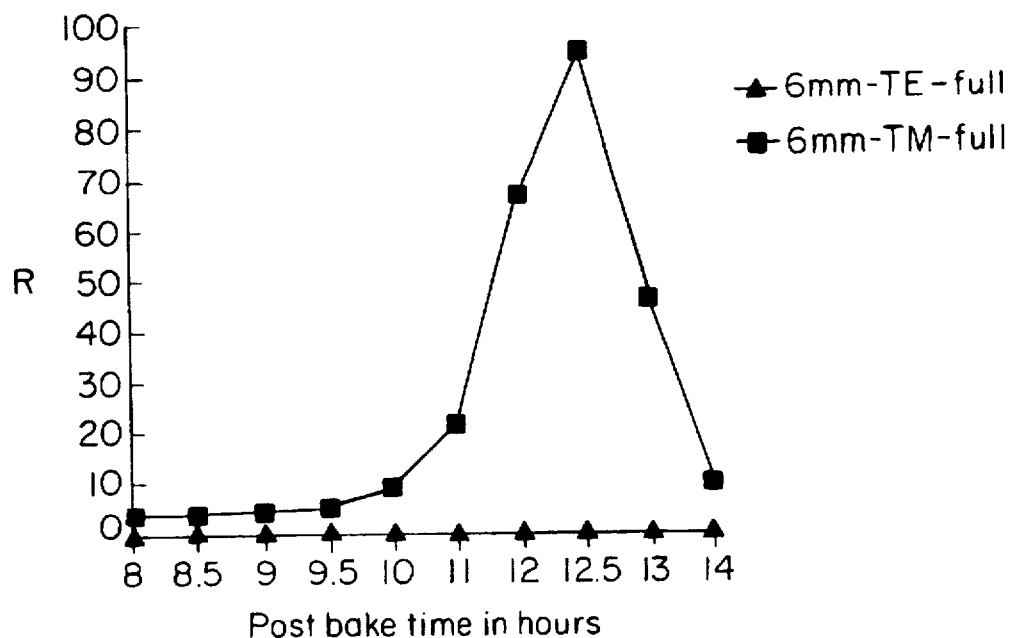
FIGS. 17a and 17b illustrate the coupling ratio as a function of postbake time for 6 mm and 4 mm beam splitters respectively made according to FIG. 9.
Figure 17B:
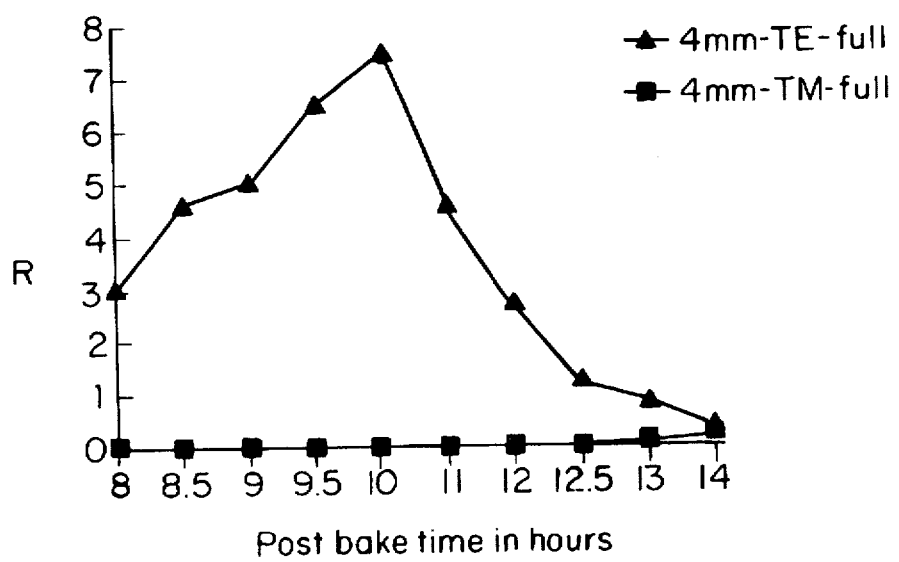

EXAMPLE I:

FIGS. 17a and 17b illustrate the coupling ratio 'R' as a function of postbake time for 6 mm and 4 mm beam splitters respectively. The coupling ratio 'R' is defined as $R = P_b/P_a$ where $P_a$ and $P_b$ are the measured powers at the output ports 19c and 19d respectively (FIG. 7).

The initial postbake was performed at 1030° C. for 8 hours followed by further postbaking at 950° C. At this temperature only aluminum is diffused further.

Figure 18A:
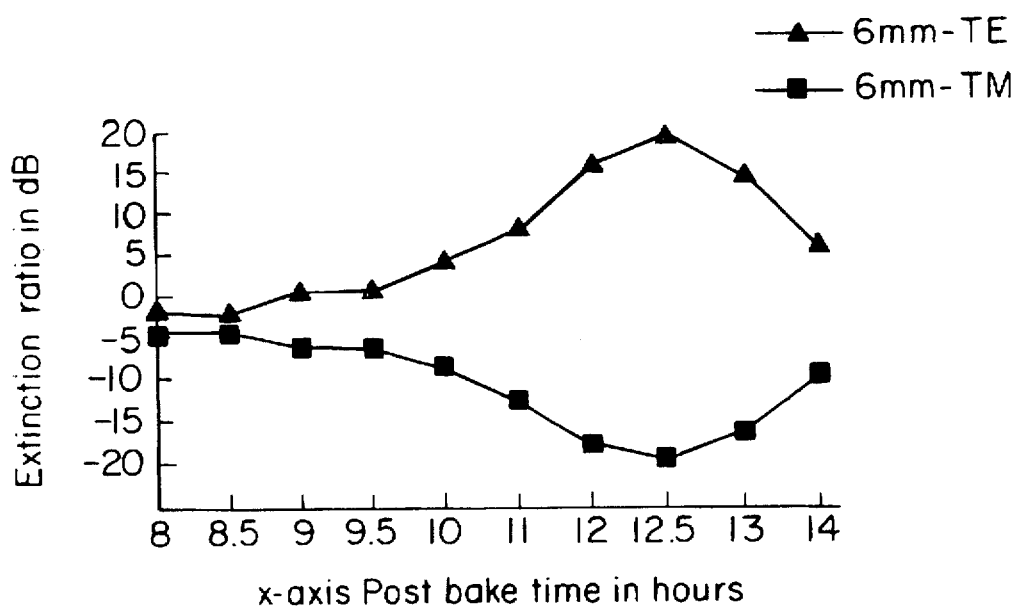
FIGS. 18a and 18b illustrate extinction ratio as a function of postbake time for 6 mm and 4 mm beam splitters respectively.
Figure 18B:
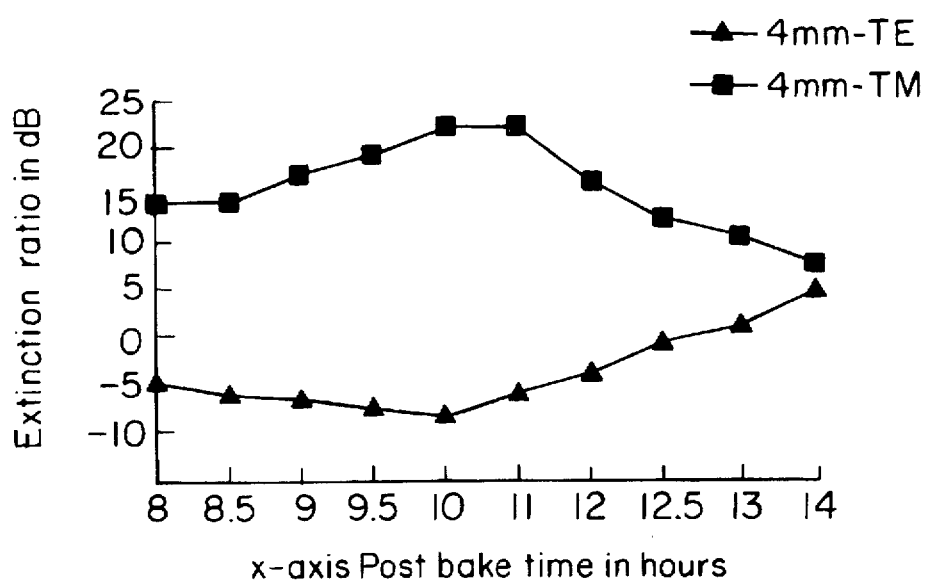

FIGS. 18a and 18b illustrate the extinction ratio in dB as a function of postbake hours for both TE and TM modes for 6 mm and 4 mm coupler respectively. From FIGS. 17a and 17b and 18a and 18b, it is seen, as postbaking continues, the coupling ratio of TM polarization increases rapidly and the coupling ratio of TE polarization decreases rapidly. For the 6 mm coupler, at 12.5 hours postbake time, the TE and TM modes are well separated with an extinction ratio of nearly 20 dB for both TE and TM polarizations. The maximum polarization splitting for the 4 mm coupler occurs in the region 10–11 hours postbake time. At this point, odd number transfer lengths of one polarization are equal to the even number transfer lengths of the other polarization.

Figure 19:
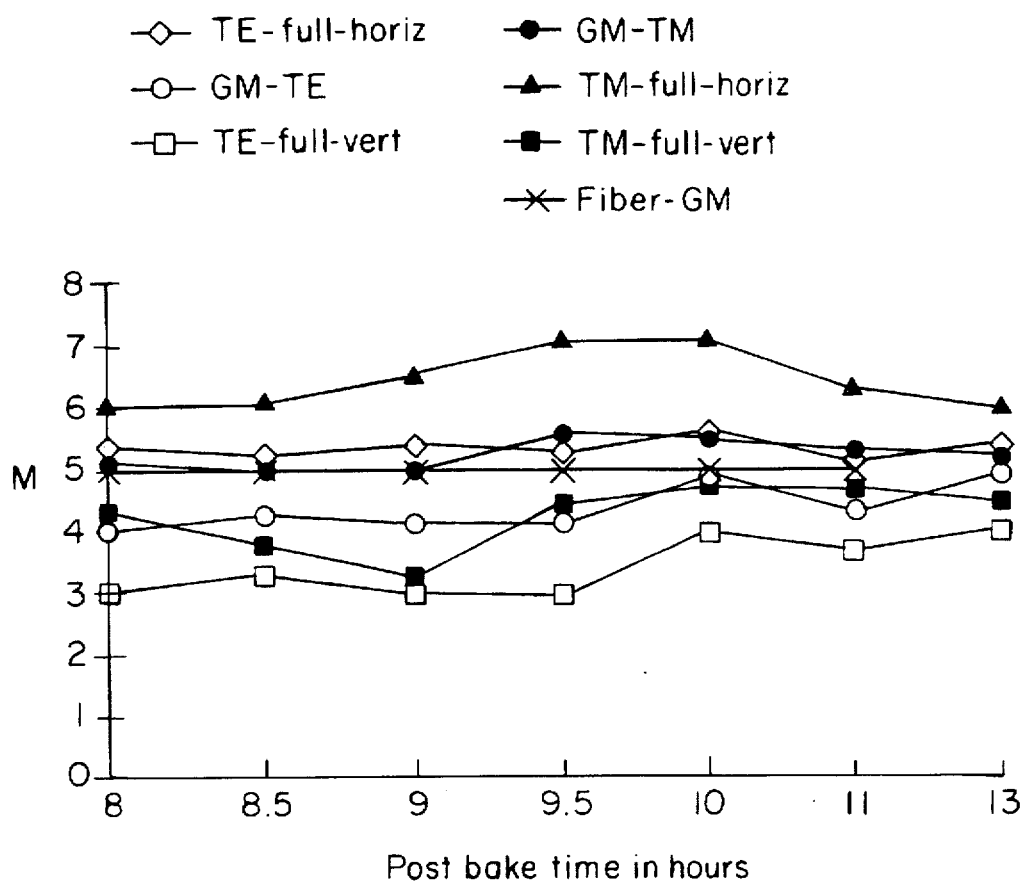
FIG. 19 shows mode size as a function of postbake time for 6 mm and 4 mm beam splitters respectively.

FIG. 19 gives the mode size as a function of postbake time for TE and TM mode size both in the horizontal and vertical directions, as well as their Geometric Mean. Also shown is the Geometric Mean mode size of the input fiber. Optical confinement in the titanium waveguide is observed to be much better with aluminum diffusion.

Figure 20:
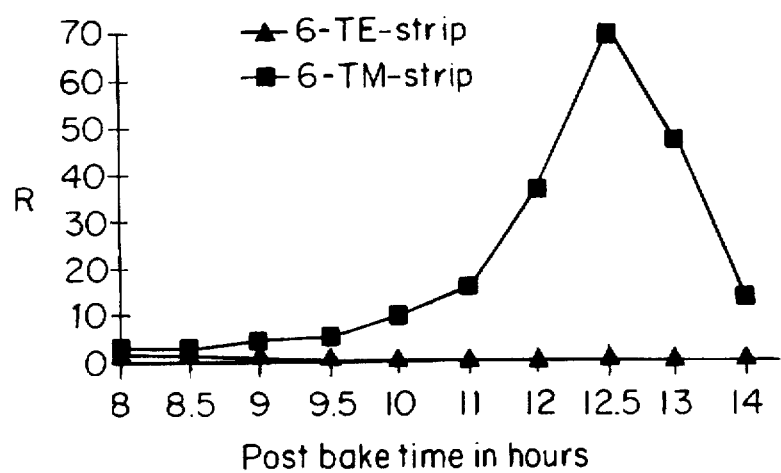

EXAMPLE II:

For this configuration, the initial postbake was also performed at 1030° C. for 8 hours and further postbake was done at 950° C., where only aluminum is diffused further. This is important so as not to impact mode matching conditions while fine tuning the coupler. FIG. 20 illustrates coupling ratio as a function of postbake time where aluminum is diffused only in the coupling region. The TE and TM modes behave in a similar way as in the previous case. The coupling ratio of the TM mode increases rapidly with postbake time and the coupling ratio of TE mode decreases rapidly, with a high extinction ratio of 15 dB for both TE and TM modes at 12 hours postbake time.

Figure 21:
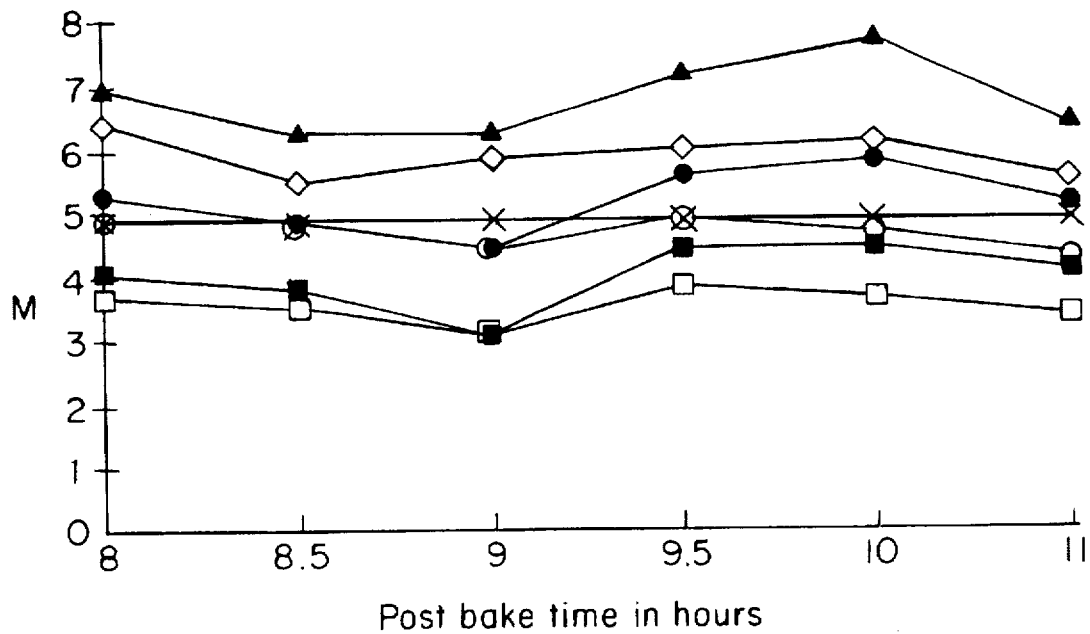
Figure 22:
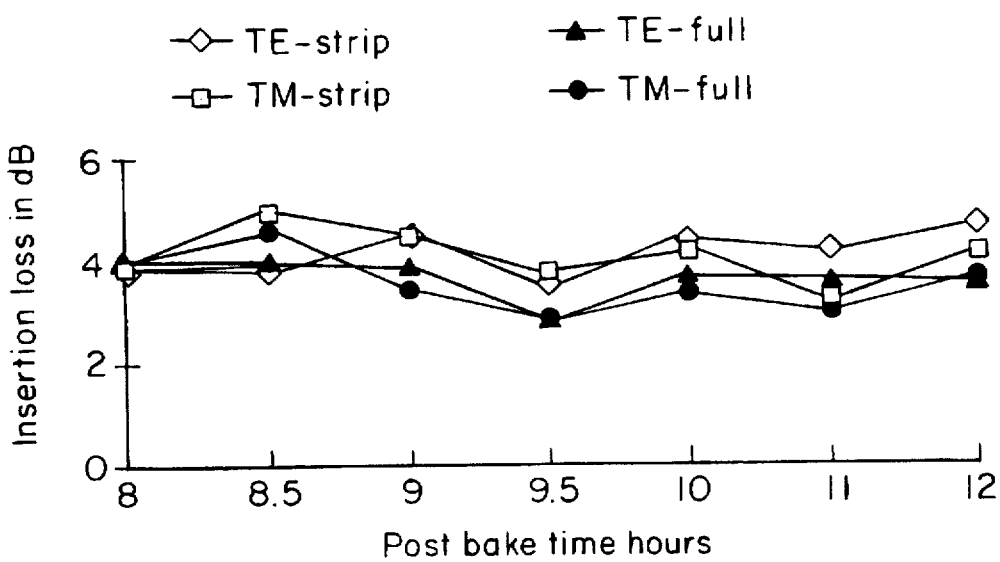

FIG. 21 shows the mode size as a function of postbake time for both TE and TM modes in the vertical and horizontal direction along with input fiber Geometric Mean. FIG. 22 gives the insertion loss in dB as a function of postbake time for both the cases where aluminum is diffused fully and as a strip. The insertion loss remains reasonably constant even up to 12 hours postbake time, indicating titanium guides were not affected during the postbake at 950° C., and good mode matching exists between the input fiber and the guides.

The extinction ratio can be further improved in different ways:

1) Incorporating polarizers in the output branches such as proton exchange polarizers and dielectric film polarizers can be used to extinguish TE and TM modes respectively. Incorporation of such polarizers can effectively produce 50 dB pure linear polarized outputs.

2) Pigtailing a few meters of polarizing fiber at the output port in orthogonal orientation can improve the extinction ratio well above 30 dB.

3) Combining both the techniques.

Figure 23A:
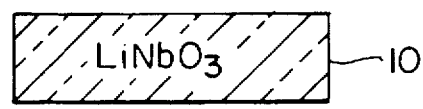
FIGS. 23a–23f are diagrammatic sectional views of intermediate stages in the method of making a guided wave device according to the present invention.
Figure 23B:
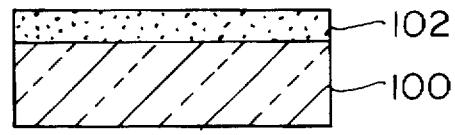

FIGS. 23a–23f illustrate the intermediate stages in the method of titanium diffusion of the present invention. In general, an x-cut, y-propagating birefringent crystalline material such as lithium niobate forms a substrate 100 as shown in FIG. 23a. A layer of photoresist 102 is spun to overlay the substrate 100 as shown in FIG. 23b.

Figure 23C:
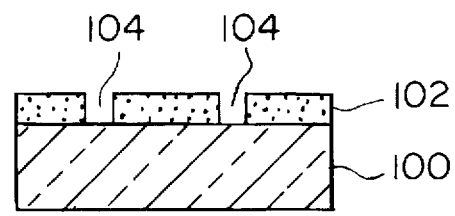

The next stage shown in FIG. 23c results from forming a pattern using standard photolithography techniques followed by development of the photoresist layer 102. The developed pattern yields channels 104. In the next step, a layer of titanium 106 having a thickness in the range of 700 Å to 1200 Å is deposited over the photoresist layer 102 and also into the channels 104 to define light guiding regions 108 therein as shown in FIG. 23d.

Figure 23D:
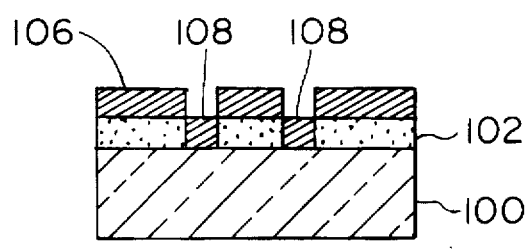
Figure 23E:
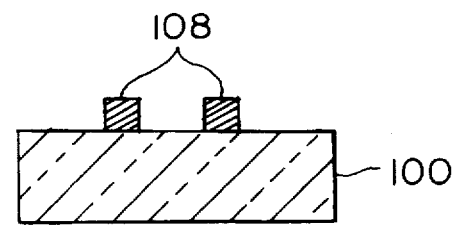
Figure 23F:
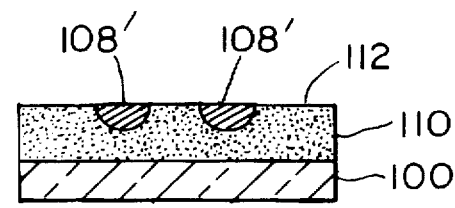

With the intermediate stage shown in FIG. 23d, a layer liftoff is performed by developing the photoresist layer 102. The layer liftoff step results in a substrate 100 having titanium light guiding regions 108 on the surface thereof as shown in FIG. 23e. The titanium guides 108 are then diffused into the substrate 100 to form diffused titanium guides 108' below the surface of substrate 100 as shown in FIG. 23f. Preferably, the titanium diffusion is achieved by heating the intermediate product of FIG. 23e in the range of 1000°–1100° C. for approximately 8 to 18 hours. The preferred diffusion time is from 10 to 14 hours. The titanium guides 108' increase both the ordinary and extraordinary indices of refraction of the lithium niobate substrate.

It should be noted that the titanium thickness range of 700 Å to 1,000 Å is preferred for fabricating devices useful at 1,310 nm. For devices operating at 1,550 nm, the preferred titanium deposition thickness is 900 Å to 1,200 Å. The line widths of guides 108 (approximately 2–10 μm) (defined in FIG. 23c) are selected empirically in combination with the above thickness and diffusion parameters to achieve optimal depth and width with respect to lateral and longitudinal diffusion in x-cut LiNbO₃.

It is well-known in the art to use wet oxygen during diffusion to prevent outdiffusion of lithium oxide. The outdiffusion rate of lithium oxide is much greater than the indiffusion rate of titanium. Outdiffusion increases the extraordinary index of refraction in the outdiffused region, which reduces the performance of the titanium guides. With the short diffusion times used in the past, the outdiffused layer thickness was comparable to the titanium indiffused layer thickness. Therefore, the increase in extraordinary index from outdiffusion interfered with the increase in extraordinary index from titanium indiffusion.

In the method of the present invention, outdiffusion is not prevented but is instead allowed to occur. An outdiffused region 110 is formed (FIG. 23f) when the substrate 100 is heated for titanium diffusion. It has been discovered that as long as the outdiffused region 110, typically at least about 25 μm, is deeper than the titanium diffusion depth of guides 108', typically about 5–10 μm, there are no deleterious effects of the outdiffusion since the titanium guides 108' now sit entirely in an outdiffused region of the substrate 100 having relatively increased extraordinary index with respect to the rest of the lithium niobate substrate 100. With diffusion times over 10 hours, an outdiffusion layer of 50 to 100 μm is typically formed in the substrate. The outdiffusion region is preferably at least twice the depth of the titanium diffusion region.

As noted above, x-cut y-propagating lithium niobate is preferred. For this cut to utilize the largest electro-optic coefficient, $r_{33}$, the electrodes in an electro-optic device fabricated in accordance with the method of the invention are preferably positioned on either side of the guides rather than on top of the guides as is the case for z-cut lithium niobate. Because of this electrode positioning, an oxide buffer layer, typically used in Z-cut lithium niobate devices to prevent propagation losses in the guides, is not needed. Eliminating the need for buffer layers yields more stable devices as the buffers such as silicon dioxide or silicon nitride can create unstable modulation characteristics and can degrade over time.

It is well-known in the prior art that the diffusion depth into a substrate for a diffusant is given by $$d = 2\sqrt{Dt}$$

where D is the diffusion constant and t is the diffusion time. D is given by $D = D_0 \exp(-T_0/T)$ where $D_0$ and $T_0$ are constants and T is the diffusion temperature. For a diffusion time t longer than the time required to completely diffuse the diffusant into the substrate, the increase in the refractive index Δn versus depth below the diffusion surface in the substrate approaches a Gaussian distribution. The diffusion depth d is known to be controllable by adjusting both t and T. In the present invention, the diffusion time t and temperature T are selected to effect sufficient diffusion to yield waveguides having mode sizes on the order of 9 to 10 μm. Mode size can be derived from the diffusion depth d and Δn(0), the refractive index increase at the diffusion surface, according to well-known techniques such as described in "Theory of Dielectric Optical Waveguides", Dietrich Marcuse, Academic Press, 1991, p. 21.

Figure 24:
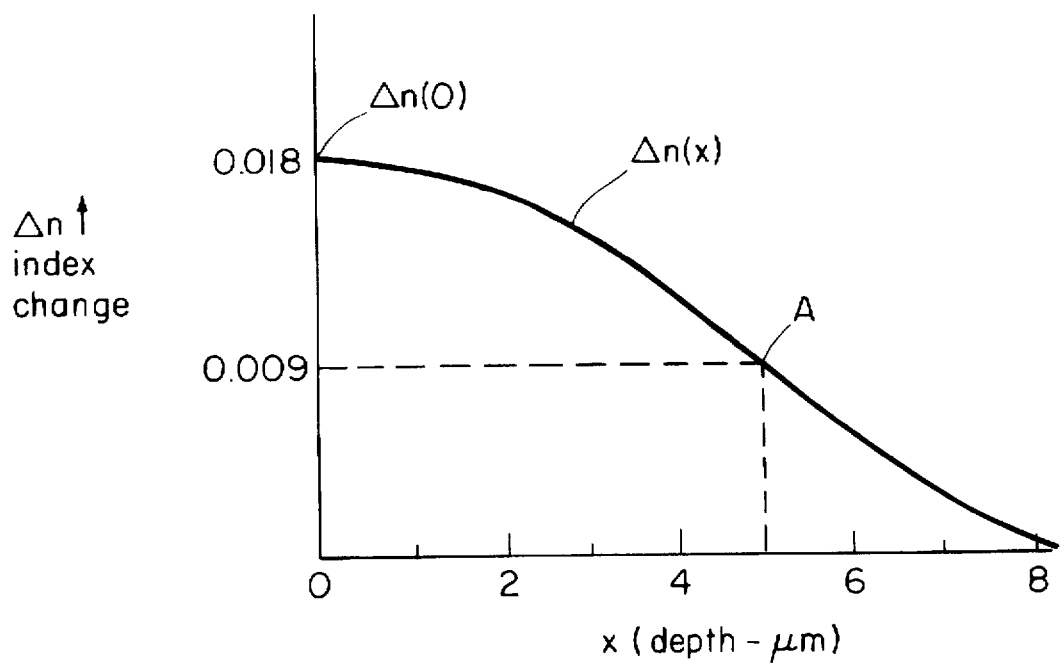
FIG. 24 is a graph showing increase in refractive index versus depth in accordance with the present invention.

FIG. 24 illustrates the refraction index profile Δn(x) for waveguides fabricated in accordance with the titanium diffusion method of the present invention, given a titanium deposition layer 108 (FIG. 23e) thickness of 800 Å and for a diffusion time of 10 hours at 1,030° C. The increase in refractive index at the diffusant surface 112 (FIG. 23f), given by Δn(0) is illustratively estimated as 0.018. The increase in refractive index is half the surface value Δn(0) at a depth of approximately 5 μm, as indicated at reference character A in FIG. 24. To properly match the optical waveguide to optical fibers larger than 8–9 microns, the depth at which the refractive index is half the surface value is deeper than five microns, preferably in the range of 5–10 microns for surface waveguide devices.

Preferred embodiments of devices fabricated in accordance with the method of the present invention are characterized as being single-mode devices at 1,310 nm or 1,550 nm and well matched in mode size to both single-mode and polarization maintaining fiber optic cables. For example, such devices are well matched to Fujikura PANDA fibers, which have a mode size of about 8 to 10 μm at 1,310 nm and about 9.5 to 11.5 μm at 1.550 nm.

Figure 25:
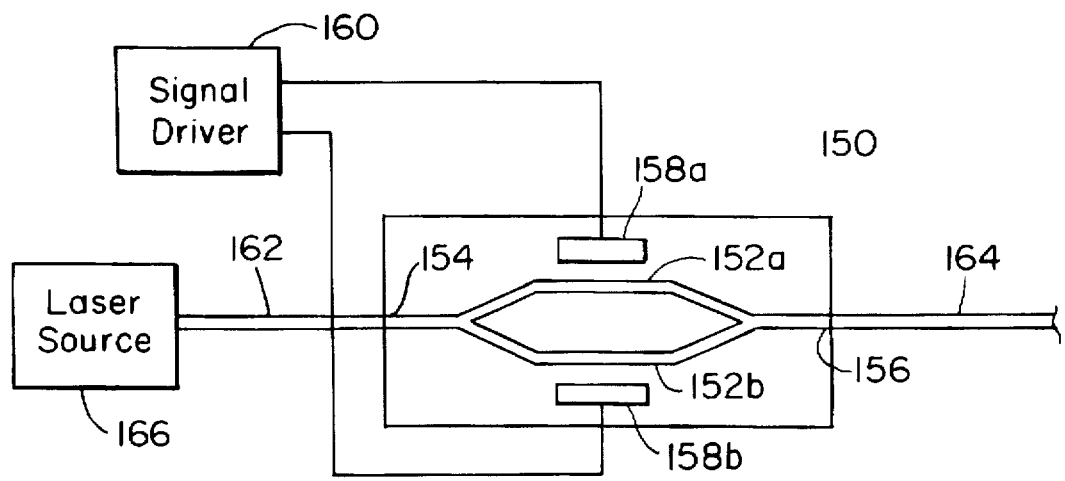
FIG. 25 is a diagrammatic top plan view of a guided wave device according to the present invention coupled to external fibers.

FIG. 25 illustrates a preferred embodiment of a Mach-Zehnder interferometer 150 having titanium guides 152a, 152b fabricated according to the titanium diffusion method of the invention. A polarization maintaining (PM) fiber 162 is coupled at one end to laser source 166 and at the other end to an input guide portion 154 of the interferometer 150. A single-mode (SM) fiber 164 is coupled to an output guide portion 156 of interferometer 150. Signal driver 160 is coupled to electrodes 158a, 158b located adjacent respective guides 152a, 152b of the interferometer 150 to modulate laser source 166 with an information signal. The PM fiber 162 is, for example, a Fujikura SM.13-P-7/125-UV/UV-250 PANDA fiber. The SM fiber 164 is, for example a Corning® SMF-28 single-mode fiber which has a mode-field diameter of 9.3±0.5 μm at 1,310 nm and 10.5±1.0 μm at 1,550 nm. It should be noted that the improved titanium diffusion method is also useful with the co-diffusion of aluminum described above. These devices are useful in analog CATV and digital communication as well as radar remoting applications.

In another aspect of the invention, a more uniform deposition of the titanium layer is achieved. The thermal evaporation of titanium starts with the nucleation of titanium in islands which form on the substrate. The titanium islands are about 50 Å thick before the film becomes continuous. At the end of the thermal evaporation, the resulting film is characterized as having local and rapid thickness variation of as much as ±25 Å. This variation results in scattering losses in the waveguide. To prevent this variation, e-beam deposition of titanium is used instead of thermal evaporation. Prior to e-beam deposition, the surface of the lithium niobate substrate is treated to enhance nucleation. Preferably, an ion-milling step is used to pre-treat the substrate surface and thereby assist rapid and uniform nucleation and reduce localized thickness variations. Alternatively, a plasma etch can be used for the step of nucleation enhancement.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of fabricating an optical waveguide in a lithium niobate crystalline material comprising the steps of:

forming a layer of titanium on a surface of the lithium niobate crystalline material;

diffusing the titanium into the crystalline material by heating the crystalline material to a diffusion temperature for a time between about 8 hours and about 18 hours to form a titanium diffusion region having a titanium diffusion depth;

outdiffusing lithium oxide from the crystalline material to produce an outdiffused region in the crystalline material having a depth greater than the titanium diffusion depth.

2. The method of claim 1 wherein the forming step is performed by e-beam deposition.

3. The method of claim 1 further comprising treating the surface of the lithium niobate prior to the step of forming the titanium layer to enhance nucleation.

4. The method of claim 3 wherein the treating comprises removing a surface layer.

5. The method of claim 4 wherein the surface layer is removed by ion-milling.

6. The method of claim 1 wherein the outdiffused region is at a depth of about 25 μm.

7. The method of claim 1 wherein the titanium is diffused to produce a mode size of between 8 and 12 μm.

8. A method of fabricating an optical waveguide in a lithium niobate material for coupling to an optical fiber comprising:

forming a layer of titanium having a thickness between 700 Å and 1200 Å over the lithium niobate material, the titanium layer contacting a surface of the lithium niobate material along a line having a width in the range of 2–12 microns;

outdiffusing lithium oxide from the lithium niobate material to form an outdiffused region having a depth in the lithium niobate material; and diffusing the titanium into the lithium niobate material by heating at a temperature between 900° C. and 1200° C. for a period of at least 8 hours to form a waveguide having a waveguide depth and a mode size of at least 8 microns such that the depth of the outdiffused region has a depth greater than the waveguide depth.

9. The method of claim 8 further comprising contacting the surface along a line having a width in the range of 5–10 microns.

10. The method of claim 8 further comprising coupling the waveguide to an optical fiber having a mode size in the range between 9 and 12 microns.

11. The method of claim 8 further comprising adjusting the cross-sectional area of the waveguide.

12. The method of claim 11 where in the step of adjusting the cross-sectional area further comprises diffusing a second material into the lithium niobate material.

13. The method of claim 12 wherein the step of diffusing a second material comprises forming a layer of aluminum on the surface and heating the aluminum.

\* \* \* \* \*